United States Patent
Reyes et al.

(10) Patent No.: US 10,885,028 B2
(45) Date of Patent: Jan. 5, 2021

(54) SEARCHING AND AGGREGATING DATA ACROSS MULTIPLE GEOLOCATIONS

(71) Applicant: Citrix Systems, Inc., Fort Lauderdale, FL (US)

(72) Inventors: Jose Reyes, Deerfield Beach, FL (US); Tom Kludy, Cooper City, FL (US); Ricardo Fernando Feijoo, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 254 days.

(21) Appl. No.: 15/875,087

(22) Filed: Jan. 19, 2018

(65) Prior Publication Data

US 2019/0228092 A1    Jul. 25, 2019

(51) Int. Cl.
*G06F 16/2453*    (2019.01)
*G06F 9/455*    (2018.01)
*G06F 16/182*    (2019.01)
*G06F 16/18*    (2019.01)
*G06F 16/23*    (2019.01)
*G06F 16/27*    (2019.01)

(52) U.S. Cl.
CPC .... *G06F 16/24532* (2019.01); *G06F 9/45533* (2013.01); *G06F 16/182* (2019.01); *G06F 16/1865* (2019.01); *G06F 16/2379* (2019.01); *G06F 16/27* (2019.01)

(58) Field of Classification Search
CPC ............... G06F 9/45533; G06F 16/182; G06F 16/1865; G06F 16/24532
See application file for complete search history.

(56) References Cited

U.S. PATENT DOCUMENTS

| | | | | |
|---|---|---|---|---|
| 6,298,382 | B1* | 10/2001 | Doi | G06F 16/2471 709/229 |
| 8,732,118 | B1* | 5/2014 | Cole | G06F 16/254 707/607 |
| 9,830,111 | B1* | 11/2017 | Patiejunas | G06F 3/0625 |
| 10,452,640 | B2* | 10/2019 | Lee | G06F 16/2365 |
| 2008/0162518 | A1* | 7/2008 | Bollinger | G06F 16/2465 |
| 2009/0240705 | A1* | 9/2009 | Miloushev | G06F 16/1824 |

(Continued)

*Primary Examiner* — Ken Hoang
(74) *Attorney, Agent, or Firm* — Banner & Witcoff, Ltd.

(57) ABSTRACT

Methods and devices for searching and aggregating data in a distributed cloud computing environment are provided. In some embodiments, a request from a client to perform a data transaction is received by a first server. The first server simultaneously spawns a plurality of threads, each thread sending to a different server of a plurality of servers the request to perform the data transaction. A response indicating whether the data transaction was performed by the server is received by the first server and from each server of the plurality of servers. In response to an indication that the data transaction was performed by one or more servers of the plurality of servers and when the data transaction is a get transaction: data corresponding to the data transaction is received by the first server and from the one more servers, the data received from the one or more servers is aggregated by the first server to form combined data, and the first server sends the combined data to the client. Finally, the first server sends a notification including information indicating a result of the data transaction to the client.

17 Claims, 9 Drawing Sheets

(56) References Cited

U.S. PATENT DOCUMENTS

2010/0095303 A1* 4/2010 Archer .................... G06F 9/505
 718/105
2011/0314082 A1* 12/2011 Koneti .................. G06F 9/5055
 709/203
2018/0288153 A1* 10/2018 Larsen .................. G06F 3/0607

* cited by examiner

SEARCHING AND AGGREGATING DATA ACROSS MULTIPLE GEOLOCATIONS

FIELD

Aspects of the disclosure relate generally to computer hardware and software. In particular, one or more aspects of the disclosure relate to computer hardware and software for search for and aggregation of data stored across multiple geolocations.

BACKGROUND

As technology advances, enterprises are increasingly turning to cloud-based solutions for the many benefits such solutions provide, including improving efficiency and productivity, providing mobility and scalability, and reducing costs. Enterprises turning to cloud-based solutions often take advantage of cloud-based storage options as the primary storage for their data, for archiving data, for distributing content to users, and for backup and disaster recovery purposes. As enterprises grow and expand geographically, so too does their data. Enterprises may move data from one location or another or may add locations as the need arises. As such, managing data distributed among multiple geographical locations can pose challenges to enterprises and those who must access the data. For example, as the distributed environments grow and change, enterprises are faced with the technical challenge of ensuring that clients and applications that use the data are able to quickly and efficiently find and access the data.

SUMMARY

Aspects of the disclosure provide technical solutions that may address and overcome one or more technical challenges associated with providing access to data in geographically distributed cloud-based storage systems.

In particular, one or more aspects of the disclosure describes providing a method for searching for data in a multi-geographical cloud-based system storing segmented and distributed data. The disclosure describes a method for accessing data when a client, which consumes the data, is unaware where in the system a particular data item resides.

In accordance with an aspect of the disclosure, a first server may receive from a client, a request to perform a data transaction. The first server may simultaneously spawn a plurality of threads, where each thread sends to a different server of a plurality of servers the request to perform the data transaction. The first server may then receive from each server of the plurality of servers, a response indicating whether the data transaction was performed by the server. In response to an indication that the data transaction was performed by one or more servers of the plurality of servers and when the data transaction is a get transaction, the first server may receive data corresponding to the data transaction from the one or more servers, may aggregate the received data to form combined data, and may send the combined data to the client. The first server may further send a notification including information indicating a result of the data transaction to the client.

In accordance with another aspect of the disclosure, a storage system may include a plurality of servers including a first server and at least one other server, and a plurality of storage areas corresponding to the plurality of servers. Each server of the plurality of servers includes a processor, a communication interface coupled to the processor, and a memory. The memory of the first server has instructions stored thereon, which when executed by the processor of the first server, configure the first server to receive, from a client and via the communication interface of the first server, a request to perform a data transaction, simultaneously spawn a plurality of threads, each thread sending to a different server of the plurality of servers the request to perform the data transaction, receive, from each server of the plurality of servers and via the communication interface of the first server, a response message indicating whether the data transaction was performed by the server, and in response to an indication that the data transaction was performed by one or more servers of the plurality of servers and when the data transaction is a get transaction, receive, from the one or more servers and via the communication interface, data corresponding to the data transaction, aggregate the data received from the one or more servers to form combined data, and send to the client and via the communication interface, the combined data, and send, to the client and via the communication interface, a notification including information indicating a result of the data transaction.

In accordance with yet another aspect of the disclosure, a first server includes a processor, and a communication interface coupled to the processor. The processor is configured to receive, from a client and via the communication interface, a request to perform a data transaction, simultaneously spawn a plurality of threads, each thread sending to a different server of a plurality of servers the request to perform the data transaction, receive, from multiple servers of the plurality servers and via the communication interface, data corresponding to the data transaction, aggregate the data received from each of the multiple servers to form combined data; and send, to the client and via the communication interface, the combined data.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features and elements, and in which.

DETAILED DESCRIPTION

In the following description, reference is made to the accompanying drawings identified above and which form a part hereof, and in which is shown, by way of illustration, various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising", and variations thereof, is meant to encompass the items listed thereafter and equivalents thereof, as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture.

Computer software, hardware, and networks, described herein, may be utilized in a variety of different system environments, including standalone, networked, remote-access (aka, remote desktop), virtualized, and/or cloud-based environments, among others.

Figure 1:
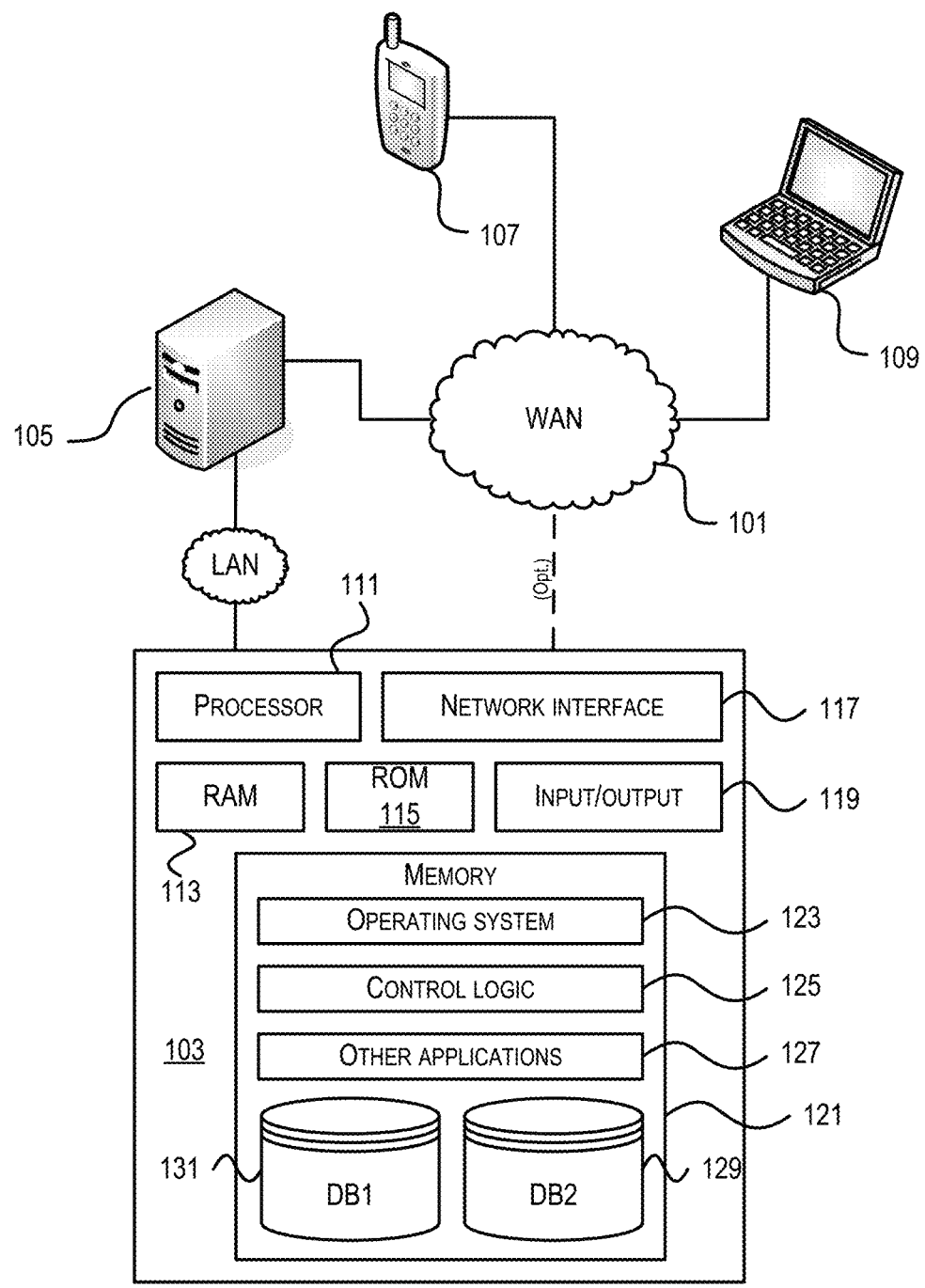
FIG. 1 depicts an illustrative computer system architecture that may be used in accordance with one or more illustrative aspects described herein.

FIG. 1 depicts an illustrative computer system architecture that may be used in accordance with one or more illustrative aspects described herein.

Referring to FIG. 1, an example of a system architecture and various data processing devices that may be used to implement one or more illustrative aspects described herein in a standalone and/or networked environment is provided. Those of skill in the art will appreciate that the specific network architecture and data processing devices used may vary and are secondary to the functionality that they provide, as further described herein.

Various components and devices of the system, such as data server 103, web server 105, and client computers 107 and 109, may be interconnected via a network 101, such as a wide area network (WAN), e.g., the Internet. Other networks may also, or alternatively, be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. The devices 103, 105, 107, 109 and other devices (not shown) may be connected to one or more of the networks 101 via twisted pair wires, coaxial cable, fiber optics, radio waves, or other communication media. The term "network", as used herein and as depicted in the drawings, refers not only to systems in which remote storage devices are coupled together via one or more communication paths, but also to stand-alone devices that may be coupled, from time to time, to such systems that have storage capability. Consequently, the term "network" includes not only a "physical network", but also a "content network," which is comprised of the data—attributable to a single entity—which resides across all physical networks.

Data server 103 provides overall access, control and administration of databases and control software for performing one or more illustrative aspects described herein. The data server 103 may be connected to web server 105, through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using client computers 107, 109, e.g., using the web browser 105 to connect to the data server 103 via one or more externally exposed web sites hosted by web server 105.

Client computers 107, 109 may be used in concert with data server 103 to access data stored therein, or may be used for other purposes. For example, from client computer 107, a user may access web server 105 using an Internet browser, as is known in the art, or by executing a software application that communicates with web server 105 and/or data server 103 over the network 101 (such as the Internet).

Servers and applications may be combined on the same physical machines, and retain separate virtual or logical addresses, or may reside on separate physical machines. For example, services provided by web server 105 and data server 103 may be combined on a single server. Each device 103, 105, 107, 109 may be any type of known computer, server, or data processing device.

Data server 103, for example, may include a processor 111, random access memory (RAM) 113, read only memory (ROM) 115, network interface 117, input/output (I/O) interface 119 (e.g., keyboard, mouse, display, printer, etc.), and memory 121.

Processor 111 may control overall operation of the data server 103.

I/O interface 119 may include a variety of interface units and drives for reading, writing, displaying, and/or printing data or files.

Memory 121 may store operating system software 123 for controlling overall operation of data server 103, control logic 125 for instructing data server 103 to perform aspects described herein, and other application software 127 providing secondary support and/or other functionality, which may or may not be used in conjunction with aspects described herein. The control logic 125 may also be referred to herein as the data server software 125. Functionality of the data server software 125 may refer to operations or decisions made automatically based on rules coded into the control logic, made manually by a user providing input into the system, and/or a combination of automatic processing based on user input (e.g., queries, data updates, etc.). Memory 121 may also store data used in the performance of one or more aspects described herein, including a first database 131 and a second database 129. In some embodiments, the first database 131 may include the second database 129 (e.g., as a separate table, report, etc.). That is, the information can be stored in a single database, or separated into different logical, virtual, or physical databases, depending on system design.

Devices 105, 107, 109 may have similar or different architecture as described with respect to data server 103. Those of skill in the art will appreciate that the functionality of data server 103 (or devices 105, 107, 109) as described herein may be spread across multiple data processing devices, for example, to distribute processing load across multiple computers, to segregate transactions based on geographic location, user access level, quality of service (QoS), etc.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language, such as (but not limited to) HyperText Markup Language (HTML) or Extensible Markup Language (XML). The computer executable instructions may be stored on a computer-readable medium, such as a nonvolatile storage device. Any suitable computer-readable storage media may be utilized, including hard disks, CD-ROMs, optical storage devices, magnetic storage devices, and/or any combination thereof. In addition, various transmission (non-storage) media representing data or events, as described herein, may be transferred between a source and a destination in the form of electromagnetic waves traveling through signal-conducting media, such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents, such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
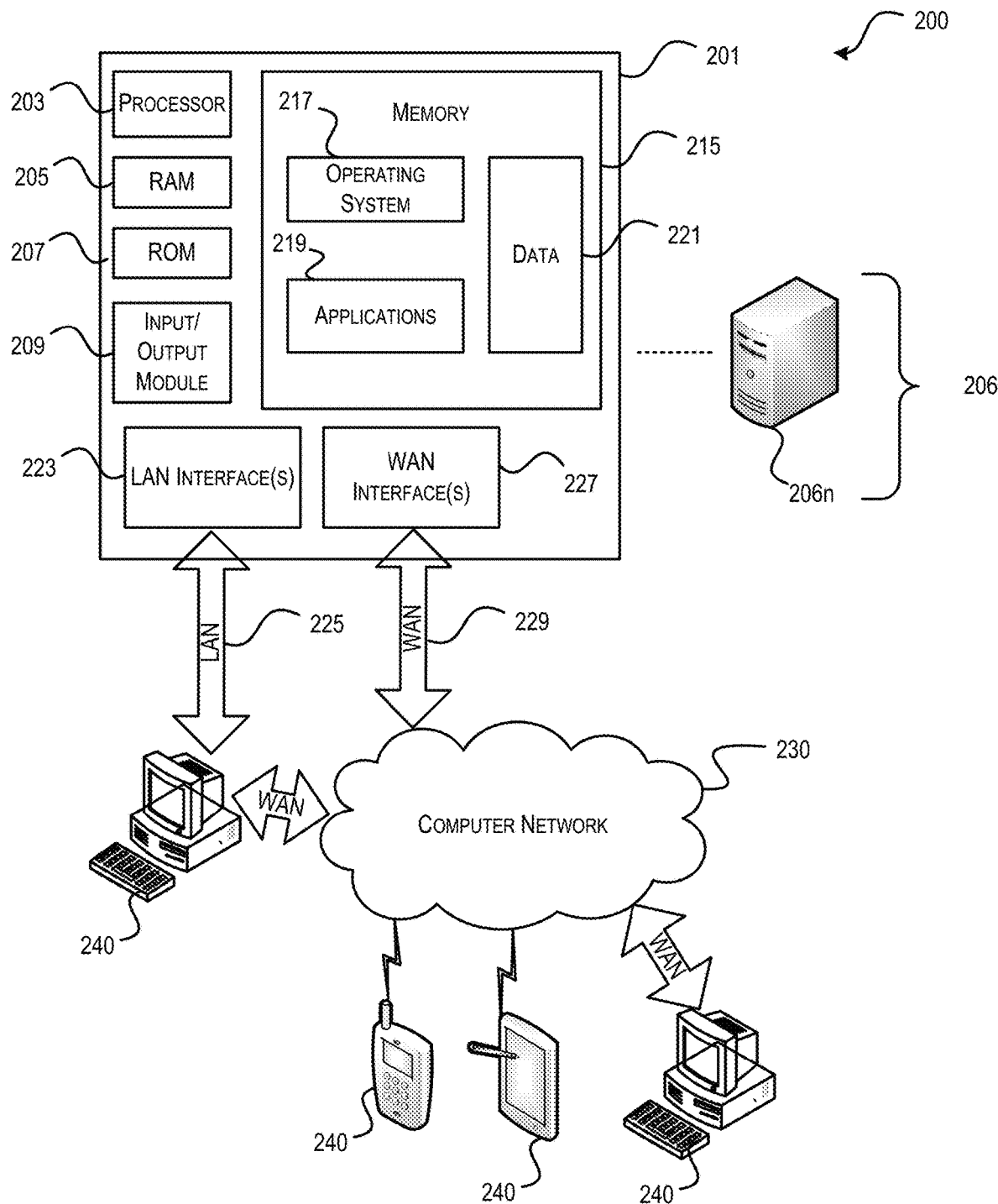
FIG. 2 depicts an illustrative remote-access system architecture that may be used in accordance with one or more illustrative aspects described herein.

FIG. 2 depicts an illustrative remote-access system architecture that may be used in accordance with one or more illustrative aspects described herein.

Referring to FIG. 2, an example of a system architecture, including a computing device 201 in an illustrative computing environment 200, that may be used to implement one or more illustrative aspects described herein is provided. Those of skill in the art will appreciate that the specific network architecture and data processing devices used may vary and are secondary to the functionality that they provide, as further described herein.

Computing device 201 may be used as a server 206a in a single-server or multi-server desktop virtualization system (e.g., a remote access or cloud system) configured to provide virtual machines for client access devices. The computing device 201 may have a processor 203, RAM 205, ROM 207, I/O module 209, memory 215, LAN interface 223, and WAN interface 227.

The processor 203 may control overall operation of the computing device 201 and its associated components.

I/O module 209 may include a mouse, keypad, touch screen, scanner, optical reader, and/or stylus (or other input devices), through which a user of computing device 201 may provide input, and may also include one or more of a speaker for providing audio output and a video display device for providing textual, audiovisual, and/or graphical output.

Memory 215 and/or other storage may store software to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers (PCs), mobile devices, laptop computers, tablets, or servers that include many or all of the elements described above with respect to the data server 103 or the computing device 201. The network connections depicted in FIG. 2 include a LAN 225 and a WAN 229, but may also include other networks. When used in a LAN networking environment, computing device 201 may be connected to the LAN 225 through the LAN interface or adapter 223. When used in a WAN networking environment, computing device 201 may include the WAN interface 227, e.g., a modem, for establishing communications over the WAN 229, such as with a computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, PCs, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the servers 206 and client devices 240. The network appliance may manage client/server connections, and in some cases can load balance client connections amongst a plurality of backend servers 206.

The client devices 240 may, in some embodiments, be referred to as a single client device 240 or a single group of client devices 240, while servers 206 may be referred to as a single server 206 or a single group of servers 206. In one embodiment, a single client device 240 communicates with more than one server 206, while in another embodiment, a single server 206 communicates with more than one client device 240. In yet another embodiment, a single client device 240 communicates with a single server 206.

A client device 240 can, in some embodiments, be referenced by any one of the following non-exhaustive terms: client machine; client; client computer; client device; client computing device; local machine; remote machine; client node; endpoint; or endpoint node. The server 206, in some embodiments, may be referenced by any one of the following non-exhaustive terms: server, local machine; remote machine; server farm, or host computing device.

In one embodiment, the client device 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. The hypervisor may be a program for creating and managing virtual machines. In some aspects, the virtual machine may be managed by a hypervisor executing on a server 206 or a hypervisor executing on a client device 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

The remote computing environment 200 may include more than one server 206a-206n such that the servers 206a-206n are logically grouped together into a server farm 206, for example, in a cloud computing environment. The server farm 206 may include servers 206a-206n that are geographically dispersed while logically grouped together, or servers 206a-206n that are located proximate to each other while logically grouped together. Geographically dispersed servers 206a-206n within a server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments, the server farm 206 can include multiple server farms.

In some embodiments, a server farm 206 may include servers 206a-206n that execute a substantially similar type of operating system platform (e.g., WINDOWS, UNIX, LINUX, iOS, ANDROID, SYMBIAN, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) Virtual Private Network (VPN) server, a firewall, a web server, an application server or master application server, a server executing an active directory, or a server executing an application acceleration program that provides firewall functionality, application functionality, or load balancing functionality. Other server types may also be used.

Some embodiments include a first server 206a that receives requests from a client device 240, forwards the request to a second server 206b, and responds to the request generated by the client device 240 with a response from the second server 206b. First server 206a may acquire an enumeration of applications available to the client device 240 as well as address information associated with an application server 206 hosting an application identified within the enumeration of applications. First server 206a can then present a response to the client's request using a web interface, and communicate directly with the client device 240 to provide the client device 240 with access to an identified application. One or more client devices 240 and/or one or more servers 206 may transmit data over computer network 230, e.g., network 101.

Figure 3:
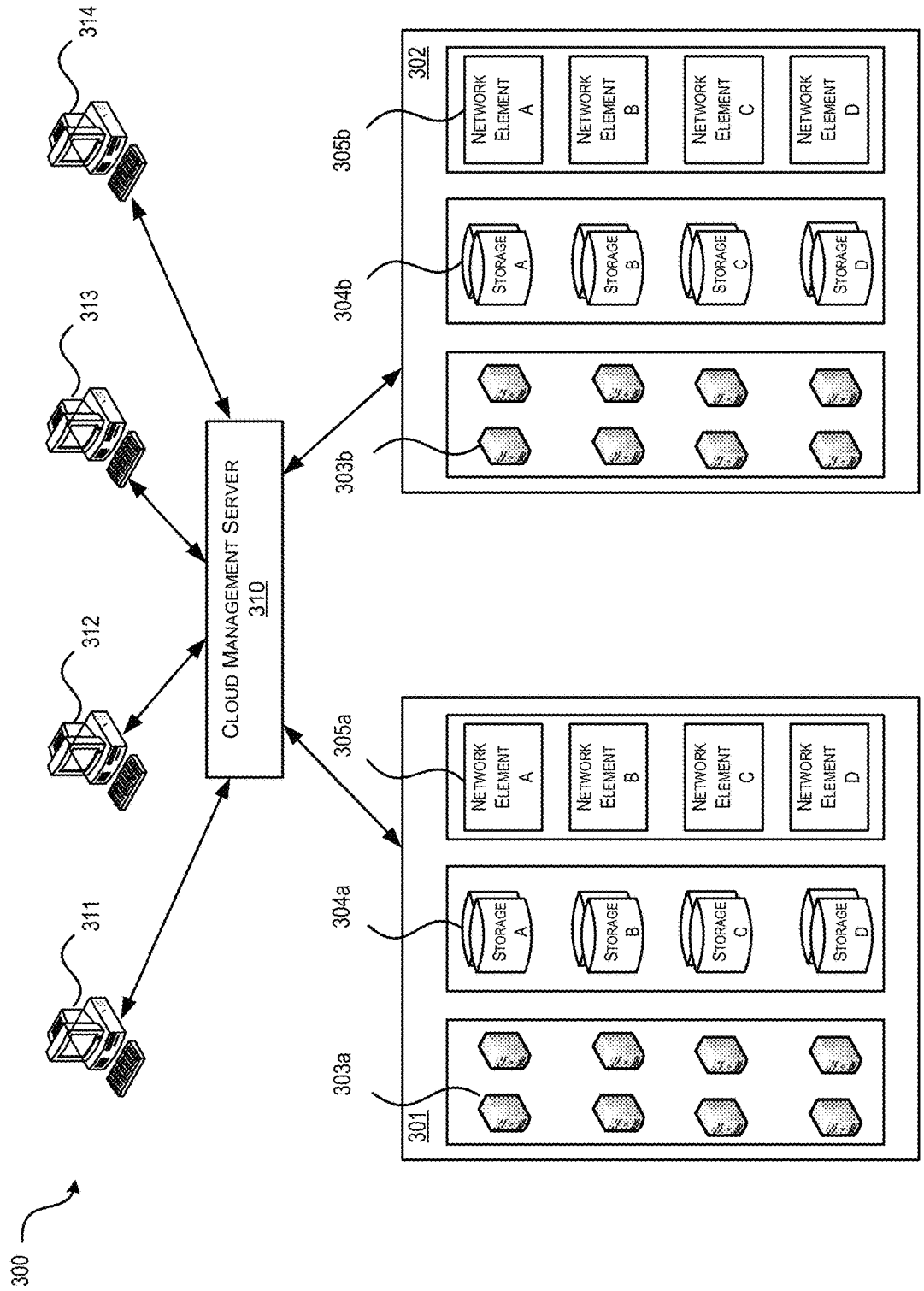
FIG. 3 depicts an illustrative cloud-based system architecture that may be used in accordance with one or more illustrative aspects described herein.

FIG. 3 depicts an illustrative cloud-based system architecture that may be used in accordance with one or more illustrative aspects described herein.

Referring to FIG. 3, an example of a cloud computing environment (or cloud system) 300 that may be used to implement one or more illustrative aspects described herein is provided. Those of skill in the art will appreciate that the specific network architecture and data processing devices used may vary and are secondary to the functionality that they provide, as further described herein.

As seen in FIG. 3, client computers 311-314 may communicate with a cloud management server 310 to access computing resources (e.g., host servers 303, storage resources 304, and network resources 305) of the cloud system 300.

The cloud management server 310 may be implemented on one or more physical servers. The cloud management server 310 may run, for example, CLOUDPLATFORM by Citrix Systems, Inc. of Ft. Lauderdale, Fla., or OPEN-STACK, among others. Cloud management server 310 may manage various computing resources 303-305, including cloud hardware and software resources, for example, host computer servers 303, data storage devices 304, and network elements 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over open or hybrid networks.

The cloud management server 310 may be configured to provide user interfaces through which cloud operators and cloud customers may interact with the cloud system 300. For example, the cloud management server 310 may provide a set of application programming interfaces (APIs) and/or one or more cloud operator console applications (e.g., web-based on standalone applications) with user interfaces configured to allow cloud operators to manage the cloud resources, configure a virtualization layer, manage customer accounts, and perform other cloud administration tasks. The cloud management server 310 also may include a set of APIs and/or one or more customer console applications with user interfaces configured to receive cloud computing requests from end users via client computers 311-314, for example, requests to create, modify, or destroy virtual machines within the cloud system 300. Client computers 311-314 may connect to the cloud management server 310 via the Internet or other communication network, and may request access to one or more of the computing resources managed by the cloud management server 310. In response to client requests, the cloud management server 310 may include a resource manager configured to select and provision physical resources in the hardware layer of the cloud system 300 based on the client requests. For example, the cloud management server 310 and additional components of the cloud system 300 may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. The cloud system 300 also may be configured to provide various specific services, including security systems, development environments, user interfaces, and the like.

Certain client computers 311-314 may be related, for example, different client computers 311-314 creating virtual machines on behalf of the same end user, or different users affiliated with the same company or organization. In other examples, certain client computers 311-314 may be unrelated, such as client computers 311-314 associated with users affiliated with different companies or organizations. For unrelated client computers 311-314, information on the virtual machines or storage of any one client computer (or user) may be hidden from other client computers (or users).

Referring to the physical hardware layer of a cloud system 300, availability zones 301-302 may refer to a collocated set of physical computing resources. Availability zones 301-302 may be geographically separated from one another in the overall cloud of computing resources. For example, availability zone 301 may be a first cloud datacenter located in California, and availability zone 302 may be a second cloud datacenter located in Florida. Cloud management sever 310 may be located at one of the availability zones 301-302, or at a separate location. Each availability zone 301-302 may include an internal network that interfaces with devices that are outside of the availability zone, such as the cloud management server 310, through a gateway. End users of the cloud system 300 (e.g., client computers 311-314) might or might not be aware of the distinctions between the availability zones 301-302. For example, an end user may request the creation of a virtual machine having a specified amount of memory, processing power, and network capabilities. The cloud management server 310 may respond to the user's request and may allocate the resources to create the virtual machine without the user knowing whether the virtual machine was created using resources from availability zone 301 or availability zone 302. In other examples, the cloud system 300 may allow end users to request that virtual machines (or other cloud resources) are allocated in a specific availability zone 301-302 or on specific computing resources 303-305 within an availability zone 301-302.

In this example, each zone 301-302 may include an arrangement of various physical hardware components (e.g., the computing resources 303-305), for example, physical hosting resources (or processing resources), physical network resources, physical storage resources, switches, and additional hardware resources that may be used to provide cloud computing services to customers.

The physical hosting resources in availability zone 301-302 may include one or more host computer servers 303, such as virtualization servers, which may be configured to create and host virtual machine instances.

The physical storage resources in availability zone 301-302 may include storage devices 304, such as solid state drives (SSDs), magnetic hard disks, and other storage devices.

The physical network resources in availability zone 301-302 may include network elements 305 (e.g., network service providers) comprising hardware and/or software configured to provide a network service, such as firewalls, network address translators, load balancers, VPN gateways, Dynamic Host Configuration Protocol (DHCP) routers, and the like, to cloud customers.

The example cloud system 300, shown in FIG. 3, also may include a virtualization layer with additional hardware and/or software resources configured to create and manage virtual machines and provide other services to customers using the physical resources in the cloud system 300. The virtualization layer may include a hypervisor, which may be a program for creating and managing any number of virtual machines, along with other components to provide network virtualizations, storage virtualizations, etc. The virtualization layer may be a separate layer from the physical resource layer, or may share some or all of the same hardware and/or software resources with the physical resource layer. For example, the virtualization layer may include a hypervisor installed in each of the virtualization servers, i.e., the host computer servers 303, with the physical computing resources.

Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Searching and Aggregating Data Across Multiple Geolocations.

One or more aspects of the disclosure may incorporate, be embodied in, and/or be implemented using one or more of the computer system architecture, remote-access system architecture, and/or cloud-based system architecture discussed above in connection with FIGS. 1-3.

Figure 4A:
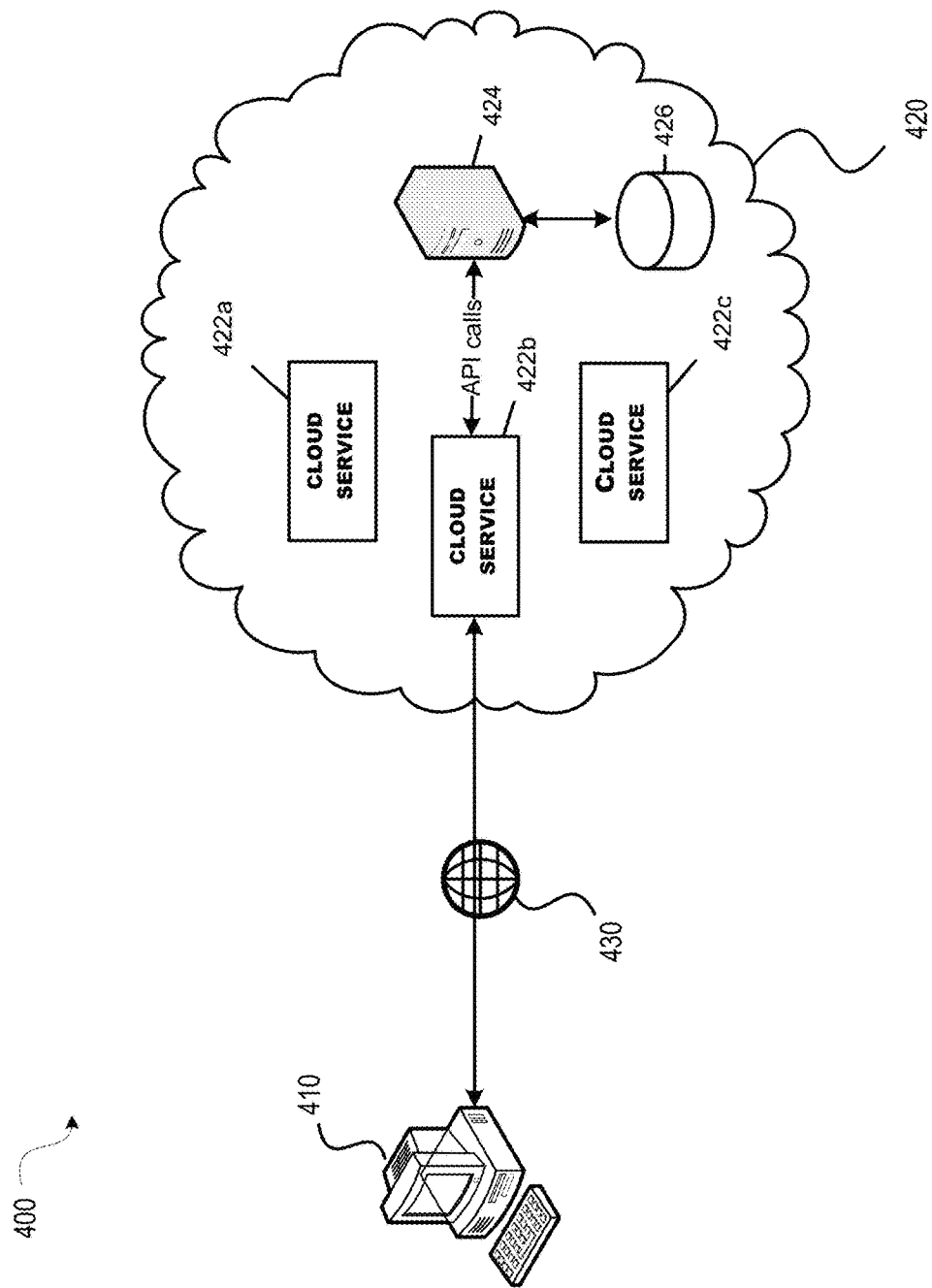
FIGS. 4A-4B depict illustrative cloud computing environments in accordance with one or more illustrative aspects described herein.
Figure 4B:
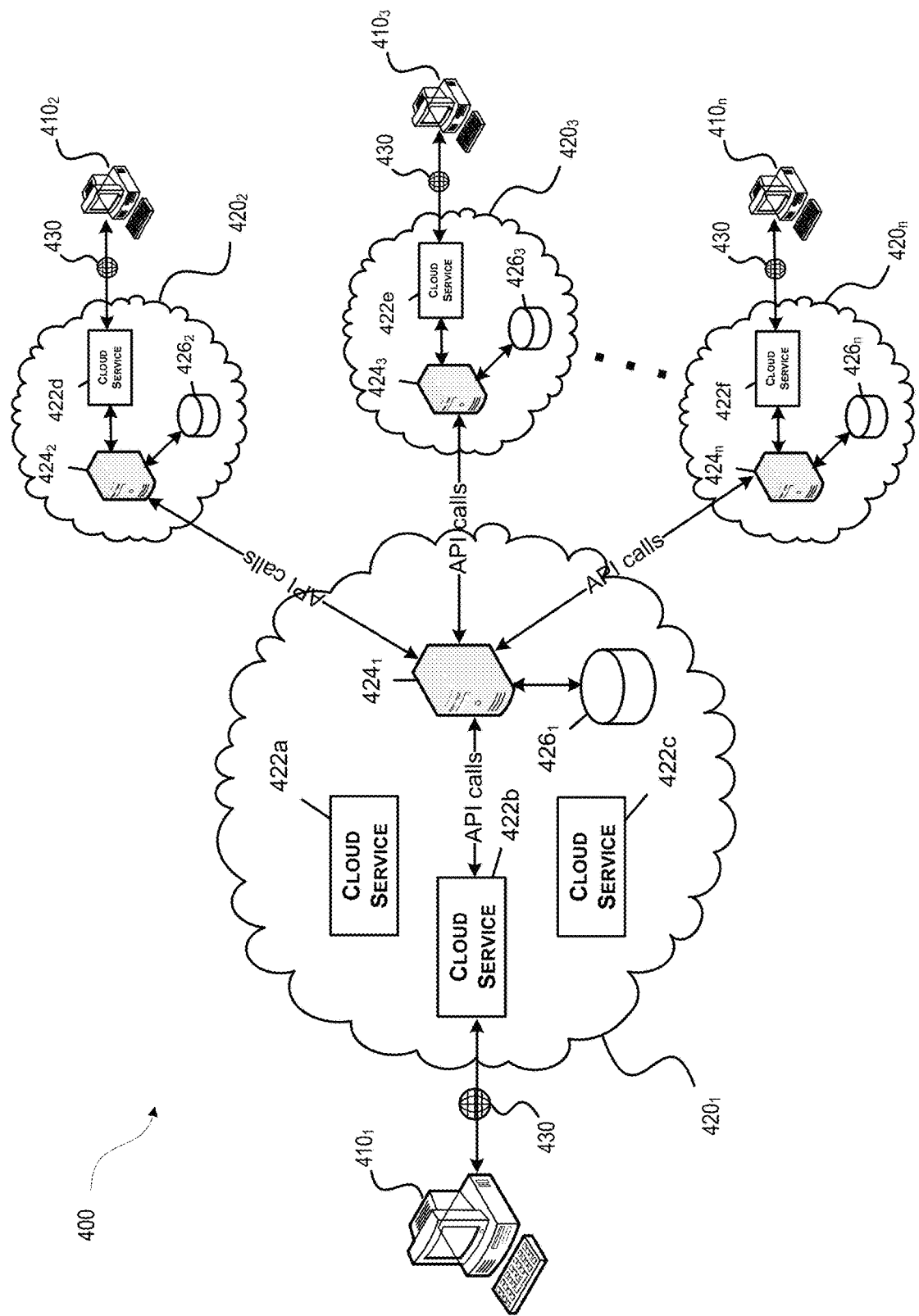

FIGS. 4A-4B depict illustrative cloud computing environments in accordance with one or more illustrative aspects described herein.

Referring to FIG. 4A, a cloud computing environment 400 is provided. The cloud computing environment 400 may include a client computing device 410 and a cloud system 420.

The client computing device 410 may establish a connection to the cloud system 420 via a network 430, such as WAN, e.g., the Internet. The network 430 may, alternatively, be a private intranet, a corporate network, a LAN, a MAN, a PAN, or the like.

The cloud system 420 may be similar to the cloud system 300 illustrated and described with respect to FIG. 3. A provider of the cloud system 420 may sell or otherwise offer customers access to a variety of cloud services 422, such as servers, storage, databases, networking, software, analytics, etc. Accordingly, a user of the client computing device 410 may subscribe to the cloud system 420 for use of one or more of the cloud services 422 hosted by the cloud system 420.

The various cloud services 422 may rely on data stored within or without the cloud system 420. For example, cloud service 422*b* may be a software application which consumes or manages data stored in a backend database or storage area $426_1$. The cloud service 422b may access the storage area 426 through a server 424. The server 424 may be similar to the cloud management server 310 illustrated and described with respect to FIG. 3.

The server 424 may publish a set of APIs for communicating with clients desiring to manage or access the various resources and services of the cloud system 420. For example, a client of the server 424 may be one of the cloud services 422 and a resource may be the storage area 426. The APIs may be representational state transfer (REST) APIs.

Accordingly, the cloud services 422 may be configured to call an API published by the server 424 to access a resource of the cloud system 420, such as the storage area 426.

However, as the data in the cloud grows or for a variety of other reasons, a provider of the cloud system 420 may segment and physically store the data across multiple storage areas, instead of in a single data storage area. In this case, access to the various data storage areas may be managed by different servers publishing their own set of APIs for accessing their respective managed storage areas. As a result, clients wishing to access the segmented data may need to be reconfigured to be aware of what data is stored in each of the multiple storage areas and which APIs to call to access the data in the correct storage area or, alternatively, to be reconfigured to make APIs calls to each of the multiple storage areas to search for needed data. Such reconfiguration across each of the various clients needing to access the segmented data is time consuming, inefficient, and prone to error. Accordingly, the present disclosure describes a method for simply and efficiently managing and accessing data distributed across multiple storage areas.

Referring to FIG. 4B, in accordance with an aspect of the present disclosure, the cloud system 420 may be distributed across multiple geographic locations $420_1$-$420_n$ (also referred to as geo-locations). The geo-locations $420_1$-$420_n$ may refer to geographically distinct locations throughout the world. For example, geo-location $420_1$ may refer to a location in the United States, while geo-location $420_2$, $420_3$, and $420_n$ may refer to locations in Australia, Japan, and China. One of ordinary skill in the art, however, will understand that the specific locations described herein are provided solely for illustrative purposes, and that the geo-locations $420_1$-$420_n$ may refer to any location in the world. Each geo-location $420_1$-$420_n$ may include an internal network that interfaces with devices in other geo-locations through a gateway.

The cloud system 420 may distribute the cloud services 422 and/or data in the multiple geographical locations $420_1$-$420_n$ for a variety of reasons, e.g., for performance reasons (i.e., to deliver information to users more quickly), for legal reasons (i.e., data sovereignty laws requiring that data about a citizen physically reside in-country, even when accessible via the cloud from outside that country), for security reasons (i.e., backup and data recovery), etc.

The geo-locations $420_1$-$420_n$ may each provide the same or different cloud services 422. The cloud services 422 may be subscribed to by users of the client computing devices $410_1$-$410_n$.

Data may be segmented and physically stored across the multiple geo-locations $420_1$-$420_n$ in storage areas $426_1$-$426_n$ and access to the data in the storage areas $426_1$-$426_n$ may be managed by servers $424_1$-$424_n$, respectively. Accordingly, cloud services 422 that need to consume or manage the data may need to access the data in one or more of the storage areas $426_1$-$426_n$. To avoid configuring each of the cloud services 422 needing access to the data to either make calls to each of the servers $424_1$-$424_n$ to search the multiple storage areas $426_1$-$426_n$ for the data or to be aware of what data is stored in each of the storage areas $426_1$-$426_n$, according to an aspect of the present disclosure, a single one of the servers $424_1$-$424_n$ may be tasked with managing access to the data in all of the storage areas $426_1$-$426_n$, based on which server receives the original request from the client. That is, the server which receives the request from a local client may, both, search the storage area it manages for the data and make calls to each of the other servers, i.e., the remote servers, to request that those servers search for the data in the storage areas managed by each.

For example, when a user of the client computing device $410_1$ uses the cloud service 422b, such as a software application, hosted by the cloud system $420_1$, the cloud service 422b may need to access data stored in one of the storage areas $426_1$-$426_n$. The cloud service 422b, unaware of which of the storage areas $426_1$-$426_n$ the data that it needs is stored in, may make an API call to the server $424_1$, i.e., the local server, that manages the cloud service 422b to request the data. In accordance with an aspect of the present disclosure, the data request may be in the form of a data transaction, such as a delete transaction, an update transaction, or a get transaction.

When the local server $424_1$ receives the data request from a local client, such as the cloud service 422b, the local server $424_1$ may simultaneously spawn multiple threads in parallel to search for the data. That is, one thread may be used to perform a search for the data locally in the storage area $426_1$ managed by the local server $424_1$ and the other threads may be used to make API calls to each of the remote servers $424_2$-$424_n$ to request the data. In this case, each of the remote servers $424_2$-$424_n$ performs a search for the data in their respectively managed storage areas $426_2$-$426_n$.

Whichever of the servers $424_1$-$424_n$ finds the data in their managed storage areas $426_1$-$426_n$ acts on the data in accordance with the data request and each of the servers $424_1$-$424_n$ may send a response to the local server $424_1$ indicating whether the server acted on the data requested. In accordance with an aspect of the present disclosure, acting on the data may mean updating the data when the data request is an update transaction, deleting the data when the data request is a delete transaction, or sending/returning the data to the local server when the data request is a get transaction.

The response from each of the servers $424_1$-$424_n$ may further include a count of the number of data items or records acted on by the server. When more than one of the servers $424_1$-$424_n$ acts on the data, the local server $424_1$ may sum the counts received in the responses from each of the servers $424_1$-$424_n$ to calculate a total count of data acted on by the servers $424_1$-$424_n$. If no data was acted on, the total count may be zero. Accordingly, the total count may serve as a means of identifying whether the data was found and acted on.

When the data request is in the form of a get transaction, the server that finds the data may act on the data by retrieving and sending the data to the local server $424_1$, and the local server $424_1$ may, in turn, return the data to the cloud service 422b that requested the data.

When the data request is in the form of a get transaction and the data is found by more than one of the servers $424_1$-$424_n$, each of the servers $424_1$-$424_n$ may act on the data by retrieving and sending the data to the local server $424_1$. In this case, the local server $424_1$ may then aggregate all of the received data into a combined data set and return the combined data set to the cloud service 422b that requested the data.

After the data is searched for locally and remotely, the local server $424_1$ may send a notification to the cloud service $422b$ indicating a result of the data request. The notification may indicate whether the data was found and acted on and, if so, by which of the servers $424_1$-$424_n$. The notification may, alternatively or additionally, indicate the total count of data items or records that were acted on. The total count may be used to indicate whether the data was found and acted on.

The above example describes a scenario where the server $424_1$ receives a data request from a local client, such as the cloud service $422b$, and the server $424_1$ searches for the data locally and simultaneously requests the data from the other servers $424_2$-$424_n$ on behalf of the cloud service $422b$. However, it should be understood that any of the servers $424_2$-$424_n$ may also receive a request from a local client and in turn be tasked with searching for the data locally and simultaneously requesting the data from the other servers.

For example, if server $424_2$ receives a request for data from the cloud service $422d$, the server $424_2$ may simultaneously spawn multiple threads in parallel to search for the data. That is, one thread may be used to perform a search for the data locally in the storage area $426_2$ managed by the server $424_2$ and the other threads may be used to make API calls to each of the servers $424_1$ and $424_3$-$424_n$ to request the data. In this case, each of the remote servers $424_1$ and $424_3$-$424_n$ performs a search for the data in their respectively managed storage areas $426_1$ and $426_3$-$426_n$.

Accordingly, each of the servers $424_1$-$424_n$ may be configured to be globally aware of the existence of each of the other servers $424_1$-$424_n$ and how to communicate with each of the other servers $424_1$-$424_n$ via an API call. Each of the servers $424_1$-$424_n$ may also be configured to be aware of the origin of a data request, i.e., whether an API call originated locally or remotely, so that the server knows whether to only perform the search of the data locally or whether to control to search for the data remotely as well. That is, when the API call originates from a local client, such as a local cloud service, the server searches for the data locally and controls to search for the data remotely as well. On the other hand, when the API call originates from a remote client, such as a remote server, the server only searches for the data locally.

In this way, as the cloud system 420 grows to include additional geo-locations storing data, only the servers $424_1$-$424_n$ need to be configured to be made aware of the additional geo-locations and their corresponding servers, and the clients, thus, need not be reconfigured with the addition of each new geo-location. As such, the development and maintenance of clients which access the data may simplified and more efficient.

Figure 5:
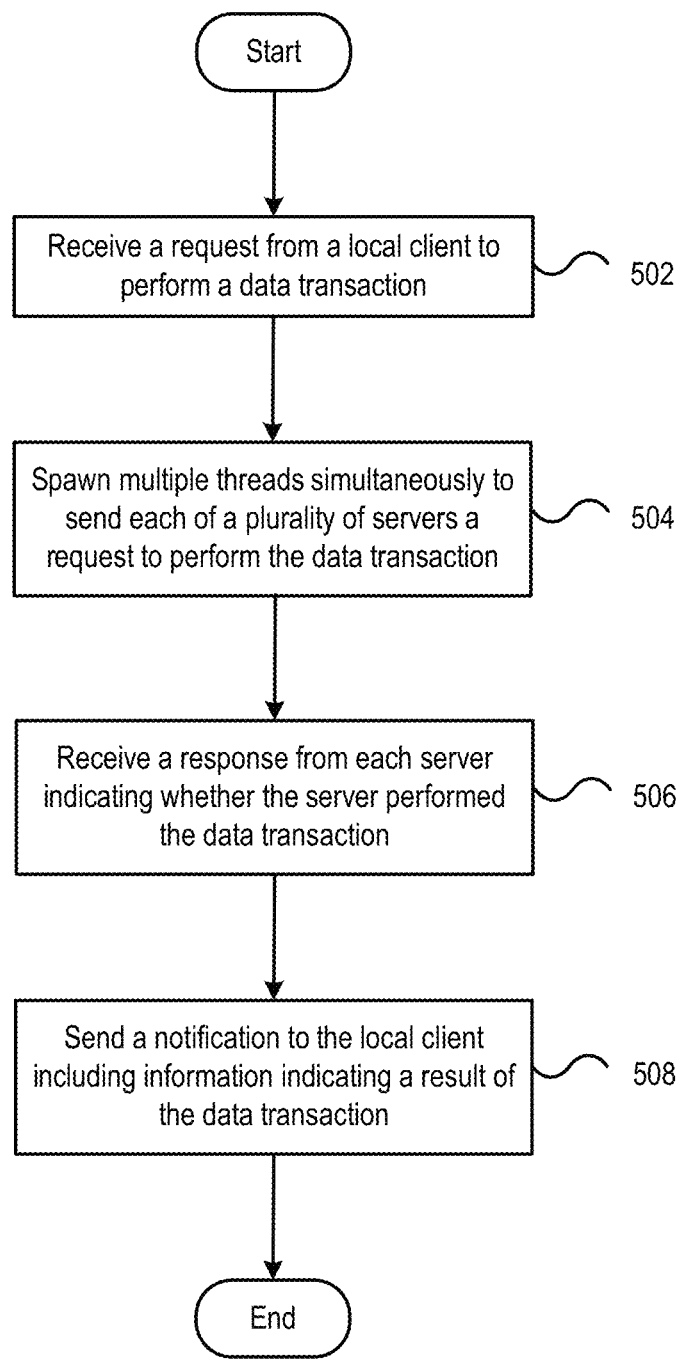
FIG. 5 depicts a flowchart of an illustrative method of searching for data in a distributed cloud computing environment in accordance with one or more illustrative aspects described herein.

FIG. 5 depicts a flowchart of an illustrative method of searching for data in a distributed cloud computing environment in accordance with one or more illustrative aspects described herein.

Referring to FIG. 5, a method is provided for a server of a first geo-location of a plurality of geo-locations in a distributed cloud system, which receives a request from a client local to the first geo-location. The sequence of events described herein may be executed by the cloud computing environment 400 illustrated in FIG. 4B.

At step 502, a server, such as server $424_1$ in geo-location $420_1$ of the cloud system 420, receives a data request from a local client, such as the cloud service $422b$. That is, the server $424_1$ receives a request from the cloud service $422b$ to perform a data transaction. The data transaction may be a delete transaction, an update transaction, or a get transaction. For example, the data request to perform a data transaction may be initiated when the user device $410_1$ executes the cloud service $422b$ which needs to consume data in the cloud system 420, such as updating, deleting, or retrieving a record from a database. The cloud service $422b$, however, may be unaware of where in the cloud system 420 the data to be acted on is located—i.e., in which of the geo-locations $420_1$-$420_n$ the data resides.

At step 504, the server $424_1$ spawns multiple threads in parallel to simultaneously search for the data at each of the geo-locations $420_1$-$420_n$. That is, the server $424_1$ spawns one thread to perform a search for the data locally in the storage area $426_1$ managed by the local server $424_1$ in the geo-location $420_1$ and spawns a plurality of additional threads to make API calls to each of the remote servers $424_2$-$424_n$ in the geo-locations $420_1$-$420_n$ to request the data from storage areas $426_2$-$426_n$ managed by the remote servers $424_2$-$424_n$.

At step 506, the server $424_1$ receives a response from each of the servers $424_1$-$424_n$ indicating whether the server acted on the requested data. In accordance with an aspect of the present disclosure, acting on the data may mean updating the data when the data request is an update transaction, deleting the data when the data request is a delete transaction, or sending/returning the data to the local server when the data request is a get transaction. The response from each of the servers $424_1$-$424_n$ may include a count of the number of data items or records that were acted on by the server. When more than one of the servers $424_1$-$424_n$ acts on the data, the local server $424_1$ may sum the counts received in the responses from each of the servers $424_1$-$424_n$ to calculate a total count of data acted on by the servers $424_1$-$424_n$. If no data was acted on, the total count may be zero. The total count may serve as a means of identifying whether the data was found and acted on by any of the servers $424_1$-$424_n$.

At step 508, the server $424_1$ sends a notification to the cloud service $422b$ including information indicating a result of the data transaction. The information may indicate whether the data was found and acted on and, if so, by which of the servers $424_1$-$424_n$. The information may, alternatively or additionally, indicate the total count of data items or records that were acted on. The total count may be used to indicate whether the data was found and acted on.

Figure 6:
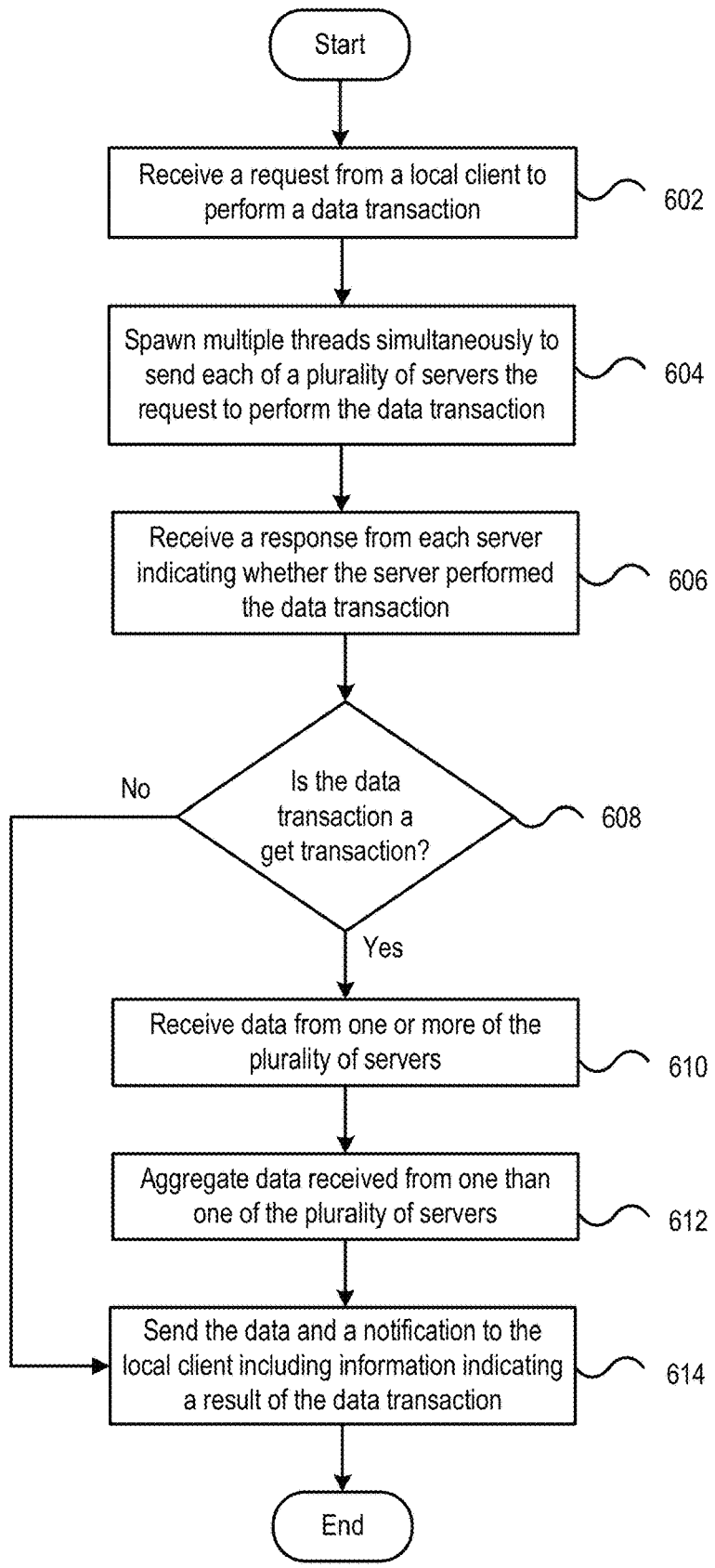
FIG. 6 depicts a flowchart of an illustrative method of searching for and aggregating data in a distributed cloud computing environment in accordance with one or more illustrative aspects described herein.

FIG. 6 depicts a flowchart of an illustrative method of searching for and aggregating data in a distributed cloud computing environment in accordance with one or more illustrative aspects described herein.

Referring to FIG. 6, a method is provided for a server of a first geo-location of a plurality of geo-locations in a distributed cloud system, which receives a request from a client local to the first geo-location. The sequence of events described herein may be executed by the cloud computing environment 400 illustrated in FIG. 4B.

Steps 602 to 606 may be the same as steps 502 to 506 described with respect to FIG. 5.

At step 608, if the data transaction to be performed is a get transaction, step 610 is performed, otherwise, if the data transaction to be performed is not a get transaction, step 614 is performed.

At step 610, when the data transaction to be performed is a get transaction, data corresponding to the data transaction may be received by server $424_1$ from one or more of the servers $424_1$-$424_n$.

At step 612, when data is received from more than one of the servers $424_1$-$424_n$, the server $424_1$ aggregates the received data from all of the servers $424_1$-$424_n$ into a combined data set.

At step 614, the server $424_1$ sends the data received from the servers $424_1$-$424_n$ to the cloud service $422b$ that requested the data. When the data was received from more than one of the servers $424_1$-$424_n$ and aggregated by the server $424_1$, the combined data is sent to the cloud service $422b$. The server $424_1$ further sends a notification to the cloud service $422b$ including information indicating a result of the data transaction. The information may indicate whether the data was found and acted on and, if so, by which of the servers $424_1$-$424_n$. The information may, alternatively or additionally, indicate the total count of data items or records that were acted on. The total count may be used to indicate whether the data was found and acted on.

Figure 7:
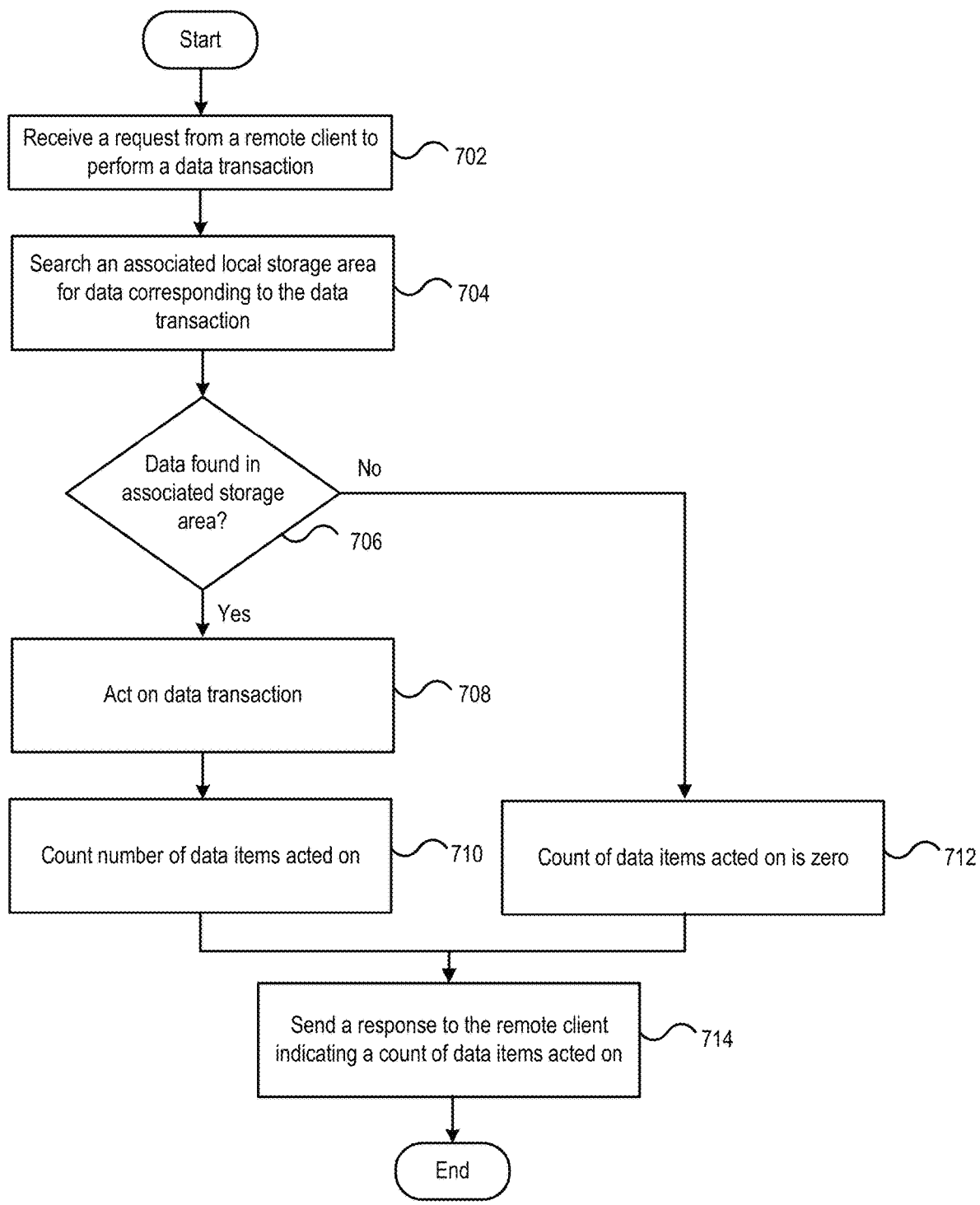
FIG. 7 depicts a flowchart of an illustrative method of searching for data in a distributed cloud computing environment in accordance with one or more illustrative aspects described herein.

FIG. 7 depicts a flowchart of an illustrative method of searching for data in a distributed cloud computing environment in accordance with one or more illustrative aspects described herein.

Referring to FIG. 7, a method is provided for a server of a first geo-location, of a plurality of geo-locations in a distributed cloud system, which receives a request from a client remote to the first geo-location. The sequence of events described herein may be executed by the cloud computing environment 400 illustrated in FIG. 4B.

At step 702, a server, such as server $424_2$ in geo-location $420_2$ of the cloud system 420, receives a request to perform a data transaction from a remote client, such as server $424_1$ in the geo-location $420_1$ of the cloud system 420. For example, the server $424_1$ may simultaneously send a plurality of remote servers, including server $424_2$, in the plurality of geo-locations $420_2$-$420_n$, a request to search for data in local storage areas $426_2$-$426_n$ managed by the servers $424_2$-$424_n$ and to perform a data transaction on the found data. The data transaction may be a delete transaction, an update transaction, or a get transaction. The request may be received via an API call.

At step 704, the server $424_2$ searches an associated local storage area for the data, such as storage area $426_2$ managed by the server $424_2$.

At step 706, if the data is found in the local storage area $426_2$, then step 708 is performed, otherwise, if the data is not found, step 712 is performed.

At step 708, if the data is found in the local storage area $426_2$, the data is acted on by the server $424_2$. That is, when the data request is an update transaction the data is updated, when the data request is a delete transaction the data is deleted, and when the data request is a get transaction, the data is returned to the remote client, i.e., server $424_1$.

At step 710, the server $424_2$ counts the number of data items acted on.

At step 712, if the data was not found in the local storage area $426_2$, the count of data items acted on is determined to be zero.

At step 714, the server $424_2$ sends a response to the server $424_1$ indicating whether the server $424_2$ acted on the data requested. The response may include the count of the number of data items acted on by the server $424_2$.

Figure 8:
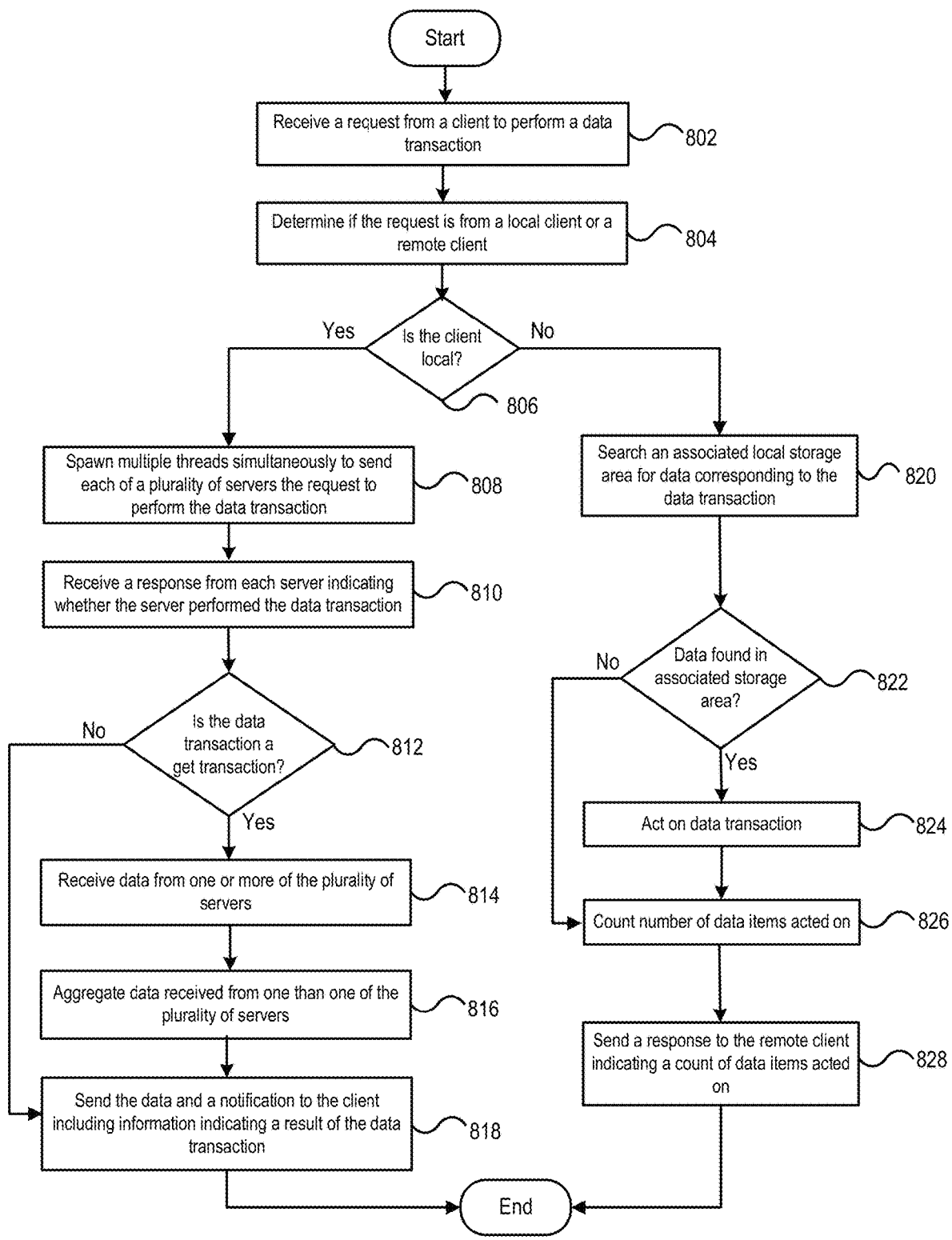
FIG. 8 depicts a flowchart of an illustrative method of searching for and aggregating data in a distributed cloud computing environment in accordance with one or more illustrative aspects described herein.

FIG. 8 depicts a flowchart of an illustrative method of searching for and aggregating data in a distributed cloud computing environment in accordance with one or more illustrative aspects described herein.

Referring to FIG. 8, a method is provided for a server of a first geo-location, of a plurality of geo-locations in a distributed cloud system, which receives a request from a client. The sequence of events described herein may be executed by the cloud computing environment 400 illustrated in FIG. 4B.

At step 802, a server, such as server $424_1$ in geo-location $420_1$ of the cloud system 420, receives a data request from client. That is, the server $424_1$ may receive a request to perform a data transaction. The data transaction may be a delete transaction, an update transaction, or a get transaction.

At step 804, the server $424_1$ determines whether the client from which the request is received is a local client, such as the cloud service $422b$ also in geo-location $420_1$, or a remote client, such as server $424_2$ in geo-location $420_2$. For example, in the case of a local client, the data request to perform the data transaction may be initiated when the user device $410_1$ executes the cloud service $422b$ in the same geo-location $420_1$ as the server $424_1$ which receives the request. Alternatively, in the case of the remote client, the data request may be initiated when the user device $410_2$ executes the cloud server $422d$ in the different geo-location $420_2$ and the server $424_2$ makes API calls to each of the remote servers $424_1$, $424_3$-$424_n$ in the geo-locations $420_1$, $420_3$-$420_n$ to request the data.

At step 806, if it is determined that the client is a local client, then step 808 is performed. Otherwise, if it is determined that the client is a remote client, then step 820 is performed.

At step 808, if it was determined that the client is a local client, such as the cloud service $422b$, then the server $424_1$ spawns multiple threads in parallel to simultaneously search for the data at each of the geo-locations $420_1$-$420_n$. That is, the server $424_1$ spawns one thread to perform a search for the data locally in the storage area $426_1$ managed by the local server $424_1$ in the geo-location $420_1$ and spawns a plurality of additional threads to make API calls to each of the remote servers $424_2$-$424_n$ in the geo-locations $420_2$-$420_n$ to request the data from storage areas $426_2$-$426_n$ managed by the remote servers $424_2$-$424_n$.

At step 810, the server $424_1$ receives a response from each of the servers $424_1$-$424_n$ indicating whether the server acted on the requested data. Acting on the data may mean updating the data when the data request is an update transaction, deleting the data when the data request is a delete transaction, or sending/returning the data to the local server when the data request is a get transaction. The response from each of the servers $424_1$-$424_n$ may include a count of the number of data items or records that were acted on by the server. When more than one of the servers $424_1$-$424_n$ acts on the data, the local server $424_1$ may sum the counts received in the responses from each of the servers $424_1$-$424_n$ to calculate a total count of data acted on by the servers $424_1$-$424_n$. If no data was acted on, the total count may be zero. The total count may serve as a means of identifying whether the data was found and acted on by any of the servers $424_1$-$424_n$.

At step 812, if the data transaction to be performed is a get transaction, step 814 is performed, otherwise, if the data transaction to be performed is not a get transaction, step 818 is performed.

At step 814, when the data transaction to be performed is a get transaction, data may be received by server $424_1$ from one or more of the servers $424_1$-$424_n$.

At step 816, when data is received from more than one of the servers $424_1$-$424_n$, the server $424_1$ aggregates the received data from all of the servers $424_1$-$424_n$ into a combined data set.

At step 818, the server $424_1$ sends the data received from the servers $424_1$-$424_n$ to the local client that requested the data, i.e., cloud service $422b$. When the data was received from more than one of the servers $424_1$-$424_n$, the combined data is sent to the cloud service $422b$. The server $424_1$ further sends a notification to the cloud service $422b$ including information indicating a result of the data transaction. The information may indicate whether the data was found and acted on and, if so, by which of the servers $424_1$-$424_n$. The information may, alternatively or additionally, indicate the total count of data items or records that were acted on. The total count may be used to indicate whether the data was found and acted on.

At step 820, if it was determined that the client is a remote client, such as the server $424_2$, the server $424_1$ searches its associated local storage area for the data, i.e., storage area $426_1$ in the geo-location $420_1$. That is, in the case of a data request from a remote client, the server $424_1$, does not spawn threads to send requests to the other geo-locations $420_2$-$420_n$ to perform the data search.

At step 822, if the data is found in the local storage area $426_1$, then step 824 is performed, otherwise, if the data is not found, step 826 is performed.

At step 824, if the data is found in the local storage area $426_1$, the data is acted on by the server $424_1$. That is, when the data request is an update transaction the data is updated, when the data request is a delete transaction the data is deleted, and when the data request is a get transaction, the data is returned to the remote client, i.e., server $424_2$.

At step 826, the server $424_1$ counts the number of data items acted on. If no data was found in the local storage area $426_1$, then the count of the number of data items acted on is determined to be zero.

At step 828, the server $424_1$ sends a response to the remote server, i.e., server $424_2$, indicating whether the server $424_1$ acted on the data requested. The response may include the count of the number of data items acted on by the server $424_1$.

Although the subject matter has been described in language specific to structural features and/or methodological acts, it is to be understood that the subject matter defined in the appended claims is not necessarily limited to the specific features or acts described above. Rather, the specific features and acts described above are provided as some example implementations of the following claims.

What is claimed is:

1. A method comprising:
receiving, by a first server of a plurality of servers and from a client, a request to perform a data transaction, wherein the request from the client is received via a representative state transfer (REST) application program interface (API);
simultaneously spawning, by the first server and based on determining that the client requesting to perform the data transaction services a same geographical area as managed by the first server, a plurality of threads, each thread sending to a server of the plurality of servers, including the first server, the request to perform the data transaction;
receiving, by the first server and from each server of the plurality of servers, a response indicating whether the data transaction was performed by the server;
in response to an indication that the data transaction was performed by one or more servers of the plurality of servers and when the data transaction is a get transaction:
receiving, by the first server and from the one or more servers, data corresponding to the data transaction;
aggregating, by the first server, the data received from the one or more servers to form combined data; and
sending, by the first server and to the client, the combined data; and
sending, by the first server and to the client, a notification including information indicating a result of the data transaction.

2. The method of claim 1, wherein each of the plurality of servers:
is located in a different geographical location, and
manages one or more cloud services associated with a particular geographical location and one or more storage areas associated with the particular geographical location.

3. The method of claim 1, further comprising summing, by the first server, counts received in the response from each server to form a total count of data acted on by the plurality of servers,
wherein the information indicating the result of the data transaction includes the total count of data acted on by the plurality or servers.

4. A method of claim 1, wherein the response from each server includes a count of data corresponding to the data transaction acted on by the server, and
wherein the method further comprises:
receiving, by each server of the plurality of servers and from the first server, the request to perform the data transaction;
querying, by each server of the plurality of servers, a storage area associated with the server, for the data;
in response to finding the data in the storage area, acting, by the server, on the data transaction; and
sending, by the server and to the first server, the response indicating whether the data transaction was performed,
wherein the indication of whether the data transaction was performed is based on the count of the data acted on by the data transaction.

5. The method of claim 4, wherein acting on the data transaction comprises one of:
deleting the data from the storage area, by the server, in response to the data transaction being a delete transaction,
updating the data in the storage area, by the server, in response to the data transaction being an update transaction, and
sending the data from the storage area, by the server and to the first server, in response to the data transaction being the get transaction.

6. The method of claim 4, wherein the data is stored in a storage area managed by the first server.

7. The method of claim 1, further comprising:
determining whether the client requesting to perform the data transaction comprises a first cloud service that services the same geographic area as managed by the first server or a remote server configured to manage a second cloud service different from the first cloud service; and
based on determining that the request is received from the first cloud service managed by the first server, simultaneously spawning the plurality of threads.

8. The method of claim 1, wherein the client requesting to perform the data transaction comprises a first cloud service hosted by a first cloud system in a first geographical area, and
wherein the first server manages one or more resources hosted by the first cloud system in the first geographical area.

9. A storage system comprising:
a plurality of servers including a first server; and
a plurality of storage areas respectively corresponding to the plurality of servers,
wherein each server of the plurality of servers comprises:
a processor;

a communication interface coupled to the processor; and a memory; and wherein the memory of the first server has instructions stored thereon, which when executed by the processor of the first server configure the first server to:

receive, from a client and via the communication interface of the first server, a request to perform a data transaction, wherein the request from the client is received via a representative state transfer (REST) application program interface (API);

simultaneously spawn, based on determining that the client requesting to perform the data transaction services a same geographical area as managed by the first server, a plurality of threads, each thread sending to a server of the plurality of servers, including the first server, the request to perform the data transaction;

receive, from each server of the plurality of servers and via the communication interface of the first server, a response message indicating whether the data transaction was performed by the server;

in response to an indication that the data transaction was performed by, one or more servers of the plurality of servers and when the data transaction is a get transaction:

receive, from the one or more servers and via the communication interface, data corresponding to the data transaction;

aggregate the data received from the one or more servers to form combined data; and send, to the client and via the communication interface, the combined data; and send, to the client and via the communication interface, a notification including information indicating a result of the data transaction.

10. The storage system of claim 9, wherein the memory of each server of the plurality of servers has instructions stored thereon, which when executed by the processor of the server configure the server to:

receive, from the first server and via the communication interface of the server, the request to perform the data transaction;

query a corresponding storage area for data corresponding to the data transaction;

in response to finding the data in the corresponding storage area, act on the data transaction; and send, to the first server and via the communication interface of the server, the response message indicating whether the data transaction was performed, wherein the indication of whether the data transaction was performed is based on a count of the data acted on by the data transaction, and wherein the response message includes the count of the data acted on by the data transaction.

11. The storage system of claim 10, wherein the data is stored in a storage area managed by the first server.

12. The storage system of claim 10, wherein the memory of the first server has further instructions stored thereon, which when executed by the processor of the first server, configure the first server to sum counts received in the response message from each server to calculate a total count of data acted on by the plurality of servers, and wherein the information indicating the result of the data transaction includes the total count of data acted on by the plurality or servers.

13. The storage system of claim 10, wherein the memory of each server of the plurality of servers has further instructions stored thereon, which when executed by the processor of the server, configure the server to act on the data transaction by deleting the data from the corresponding storage area, in response to the data transaction being a delete transaction.

14. The storage system of claim 10, wherein the memory of each server of the plurality of servers has further instructions stored thereon, which when executed by the processor of the server, configure the server to act on the data transaction by updating the data in the corresponding storage area, in response to the data transaction being an update transaction.

15. The storage system of claim 10, wherein the memory of each server of the plurality of servers has further instructions stored thereon, which when executed by the processor of the server, configure the server to act on the data transaction by sending the data to the first server, in response to the data transaction being a get transaction.

16. A first server comprising:

a processor; and a communication interface coupled to the processor, wherein the processor is configured to:

receive, from a client and via the communication interface, a request to perform a data transaction on first data, wherein the request from the client is received via a representative state transfer (REST) application program interface (API);

simultaneously spawn, based on determining that the client requesting to perform the data transaction services a same geographical area as managed by the first server, a plurality of threads, wherein a first thread, of the plurality of threads, is used to control the first server to search for the first data in a storage area associated with the first server and to perform the data transaction if the first data is stored in the storage area associated with the first server, and wherein each remaining thread, of the plurality of threads, is used to send to a different server, of a plurality of servers, a request to search for the first data in a storage area associated with the different server and to perform the data transaction if the first data is stored in the storage area associated with the different server;

receive, from one or more servers, of the first server and the plurality of servers, data corresponding to the data transaction;

aggregate the data received from each of the one or more servers to form combined data; and send, to the client and via the communication interface, the combined data.

17. The server of claim 16, wherein each of the first server and the plurality of servers:

is located in a different geographical location, and manages one or more cloud services associated with a particular geographical location and one or more storage areas associated with the particular geographical location.

* * * * *